United States Patent [19]
Fletcher et al.

[11] 3,782,205
[45] Jan. 1, 1974

[54] TEMPERATURE COMPENSATED DIGITAL INERTIAL SENSOR

[75] Inventors: James C. Fletcher, Administrator of the National Aeronautics and Space Administration with respect to an invention of; Patrick J. Hand, Altadena, Calif.

[73] Assignee: The United States of America as represented by the National Aeronautics & Space Administration, Washington, D.C.

[22] Filed: Nov. 9, 1972

[21] Appl. No.: 305,012

[52] U.S. Cl. .................... 73/497, 73/517 B, 74/5.6
[51] Int. Cl. .................... G01p 15/08, G01c 19/30
[58] Field of Search .............. 73/497, 517 B, 393; 318/634; 74/5.6

[56] References Cited
UNITED STATES PATENTS
3,527,991  9/1970  Sackin .......................... 318/634

*Primary Examiner*—James J. Gill
*Attorney*—Monte F. Mott et al.

[57] ABSTRACT

A circuit of the type which maintains the inertial element of a gyroscope or accelerometer at a constant position by delivering pulses to a rebalancing motor, wherein the circuit compensates for temperature changes by utilizing a temperature sensor that varies the threshold of inertial element movement required to generate a rebalance pulse, to thereby compensate for changes in viscosity of the floatation fluid. The output of the temperature sensor also varies the output level of the current source, to compensate for changes in the strength of the magnets of the rebalancing motor, and the sensor also provides a small signal to the rebalance motor to provide a temperature-dependent compensation for fixed drift or fixed bias.

8 Claims, 7 Drawing Figures

PATENTED JAN 1 1974
3,782,205
SHEET 1 OF 3
FIG. 2
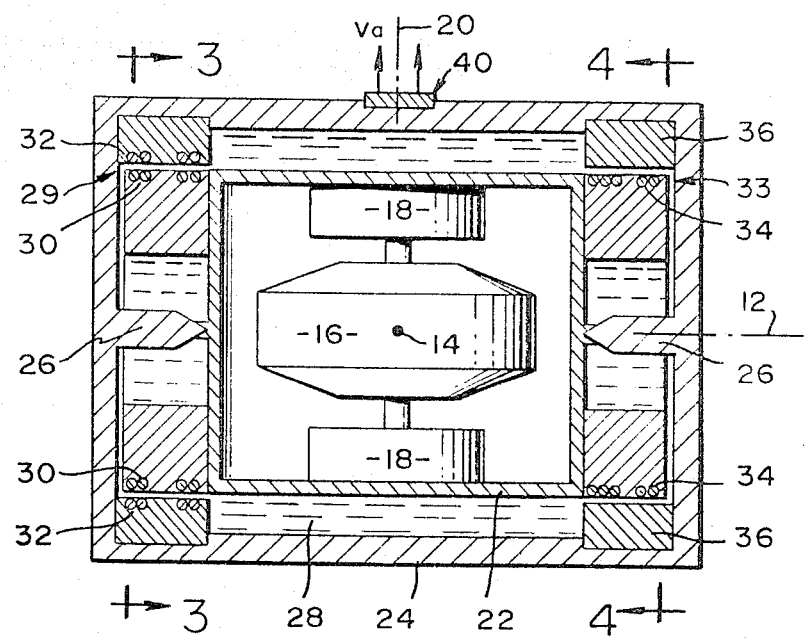
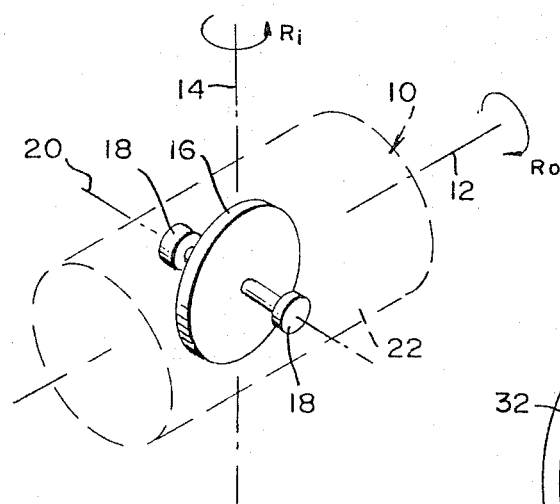
FIG. 1
FIG. 3
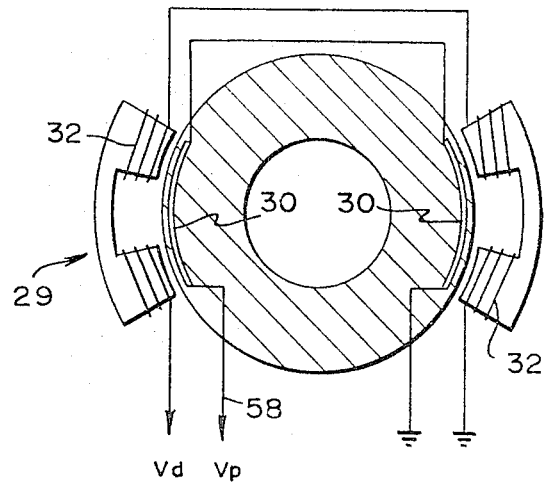

TEMPERATURE COMPENSATED DIGITAL INERTIAL SENSOR

ORIGIN OF THE INVENTION

The invention described herein was made in the performance of work under a NASA contract and is subject to the provisions of Section 305 of the National Aeronautics and Space Act of 1958, Public Law 85-568 (72 Stat, 435; 42 USC 2457).

BACKGROUND OF THE INVENTION

This invention relates to digital rebalance inertial sensor systems, and more particularly to temperature compensation apparatus therefor.

Inertial sensors used on board spacecraft and other vehicles often include a gyro or accelerometer inertial element suspended in viscous floatation fluid, a position sensor for detecting minute movements of the inertial element relative to a surrounding case, and a torquer or linear motor for returning the inertial element to a neutral position every time it deviates a small amount therefrom. One common type of system is a digital rebalance type which generates an accurately controlled/rebalance pulse every time the inertial element reaches a predetermined deviation. The rebalance pulse has a magnitude and duration which restores the inertial element to the neutral position. A computer that counts the number of rebalance pulses can determine the position of the vehicle.

The operation of the inertial system is temperature dependent, and therefore steps must be taken to account for this in order to maintain high accuracy. A major source of temperature-caused error is due to changes in viscosity of the floatation fluid that vary the gain of the inertial element, or in other words, the amount of movement of the element for a predetermined movement of the vehicle. Another source of error arises from the variation in magnetic strength of the permanent magnet used in the torquer or linear motor. Still another source of error arises from the variation in fixed drift or bias with temperature.

Errors due to temperature changes can be avoided by maintaining a constant temperature in the environment of the inertial element, by utilizing a heater. However, the heater requires considerable power. Particularly in the case of spacecraft designed for long-term voyages, conservation of power is very important. Another way of compensating for temperature changes is to utilize thermistors, or temperature-dependent resistors, in the rebalancing circuitry. However, compensation for three types of error (fluid viscosity, magnet strength, and fixed drift or bias) would normally require the use of three thermistors, all of which have to be mounted in the environment of the inertial sensors. If the circuitry is spaced from the inertial element, then long leads might be required for connection to the thermistors, and where the currents flowing through the thermistors are very low, signal pickup or noise can present a problem. Furthermore, it is often desirable to standardize the mechanical portions of the inertial systems, and to alter only the electronics to fit particular applications. The particular thermistors required would be peculiar to the particular electronic circuits, and since the thermistors have to be incorporated in the mechanical portion of the system, this would obviate standardization of the mechanical portions. Furthermore, the fixed drift or fixed bias of each inertial element is peculiar to it, and it would require the choosing and mounting of a thermistor peculiar to each inertial sensor after testing the mechanical portion, if thermistor compensation elements were utilized.

SUMMARY OF THE INVENTION

In accordance with one embodiment of the present invention, a digital rebalance electronic circuit is provided for use with inertial sensors, which utilizes a minimum of power, which is relatively simple and light weight, and which permits standardization of the mechanical components of inertial sensor systems. The circuit includes a single standardized temperature sensor mounted on the case of the inertial sensor, for generating a voltage signal proportional to temperature. The system includes a comparator circuit which compares the output of a position sensor, or pickoff, to the temperature sensor signal. The comparator generates an enabling signal when the inertial element moves a certain small distance away from its neutral position, and this results in a rebalance pulse that restores the inertial element. When the temperature of the floatation fluid changes, the temperature sensor output also changes, and a different amount of inertial sensor movement is required before the comparator generates a pulse. The change in output of the temperature sensor compensates for variations in floatation fluid viscosity, so that one pulse from the comparator represents the same amount of vehicle movement regardless of temperature.

Each pulse from the comparator switches on a current source of an accurately controlled magnitude that provides a rebalance pulse to move the inertial element back to its neutral position. The current source is regulated by the voltage output of the temperature sensor so that the amount of current in each rebalance pulse varies with temperature. The variation of rebalance current compensates for variations in strength of the magnet of the rebalancing motor, so that the motor generates the same force at any temperature.

The temperature signal from the temperature sensor also passes through a large resistor to the rebalancing motor to compensate for fixed drift or fixed bias. The amount of fixed drift or bias varies with temperature, and the correcting signal also varies with temperature so that the correction is accurately maintained.

BRIEF DESCRIPTION OF THE DRAWINGS

FIG. 1 is a simplified illustration of a gyro type of inertial element, showing how the element responds to a force input;

FIG. 2 is a sectional view of the mechanical portion of a gyroscopic sensor system constructed in accordance with the invention;

FIG. 3 is a view taken on the line 3—3 of FIG. 2;

DESCRIPTION OF THE PREFERRED EMBODIMENTS

Figure 5:
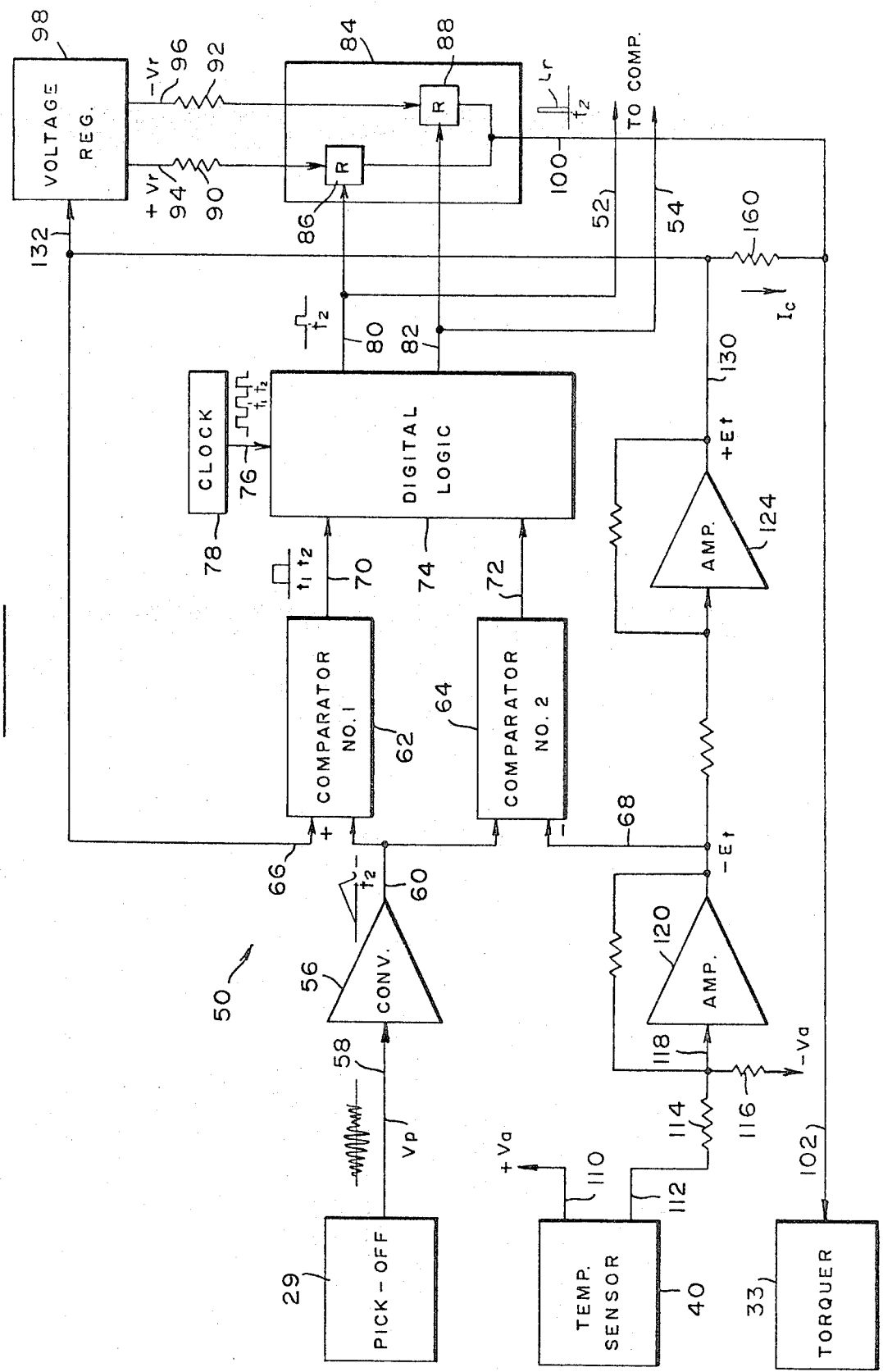
FIG. 5 is a simplified block diagram of the gyroscopic sensor electronic system which is utilized with the mechanical portion of FIG. 2.
Figure 4:
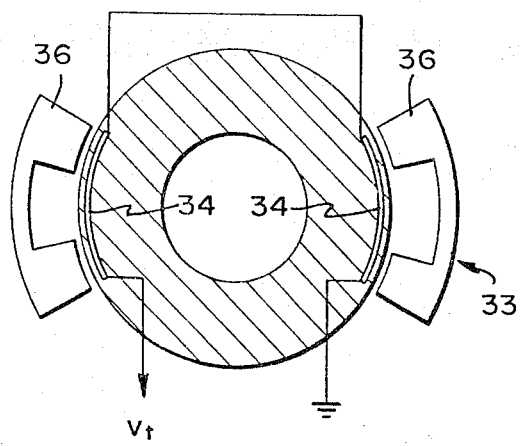
FIG. 4 is a view taken on the line 4—4 of FIG. 2.

FIG. 1 illustrates a gyroscopic system which includes a gyroscopic inertial element 10 which turns about an output axis 12 when forced to turn about an input axis 14. The rotor assembly or inertial element 10 includes a wheel 16 which rapidly rotates in bearings 18 about a spin axis 20. The bearings 18 are fixed to a wheel housing 22, and the housing 22 is constrained to rotation about the output axis 12. When the inertial element is subjected to a predetermined rotation $R_i$ about the input axis, it responds by rotating a predetermined amount $R_O$ about the output axis. The ratio of output rotation to input rotation is the gain of the element (which may be less than one). In rebalancing inertial systems, the inertial element is not allowed to move far from a predetermined neutral position with respect to the vehicle. As soon as the gyroscopic element 10 has rotated a predetermined small distance, such as a few seconds of arc, about the output axis 12, a rotational motor or torquer is activated to restore the element to its initial position. By counting the number of restoring pulses, it is possible to determine how far the element would have turned, and therefore to determine the amount of input rotation about the axis 14.

FIG. 2 illustrates details of the gyroscope, which includes a case 24 disposed about the inertial element 10. A pair of bearings 26 fixed to the case pivotally mount the inertial element 10 therewithin. A floatation fluid 28 is disposed in the volume between the housing 22 of the inertial element and the case 24 to float the inertial element and therefore minimize the friction at the bearings 26. The position of the inertial element 10 with respect to the case 24 is sensed by a position sensor 29 which includes a pair of coils 30 fixed to the inertial element and a pair of coils 32 fixed to the case 24. One of these sets of coils 32 is connected to an AC source $V_d$, while the other set of coils 30 deliver an output $V_p$ indicating the position of the inertial element. The position signal $V_p$ is an AC signal of an amplitude proportional to deviation of the inertial element from a predetermined neutral position and of a phase which depends on the direction of the deviation. The signal $V_p$ is zero when the inertial element is at the neutral position. The apparatus also has a motor or torquer 33 formed by a pair of coils 34 fixed to the inertial element 10 and a pair of permanent magnets 36 fixed to the case 24. The coils 34 can receive drive or torquer pulses $V_t$ that rotate the inertial element to restore it to its neutral position when it deviates therefrom.

When the space vehicle on which the gyro assembly is mounted turns about the input axis 14, and the inertial element 10 begins to turn about the output axis 12, the position sensor 29 senses this. When the inertial element deviates a predetermined distance, a torquer pulse is delivered to the torquer 33, the pulse being of a polarity, magnitude, and duration which is sufficient to restore the inertial element to its neutral position. If the space vehicle turns by a large angle, then the inertial element will repeatedly move away from the neutral position and torquer pulses will be repeatedly supplied to the torquer to restore the element to the neutral position. A computing circuit that counts the number of pulses and their polarity, can readily determine the angular position of the vehicle about the input axis 14.

The accuracy of an inertial system can be greatly affected by temperature. As the temperature increases, the viscosity of the floatation fluid 28 decreases and the gain of the inertial element increases; that is, the inertial element 10 undergoes a greater rotation about the output axis 12 for a constant rotation of the system about the input axis 14. This can lead to loop oscillations, as where one positive torquer pulse moves the element so far that it immediately causes a negative torquer pulse, and so forth. Another source of temperature-caused error arises from changes in the strength of the magnets 36 of the torquer, the magnetic strength decreasing as the temperature increases, and therefore affecting the efficiency of the motor in performing work for a given current-time integral. Still another source of error arises from fixed bias which is often referred to as fixed drift, which is the constant tendency of the inertial element 10 to rotate in one direction about the output axis 12. The fixed drift arises from the fact that wires extend from the inertial element 10 to the case 24 to carry current to the coils 30 and 34 of the position sensor and torquer and to the spin motor in the wheel 16. Although extremely fine wires are utilized, they produce some bias towards inertial element rotation, and this bias varies with temperature. Of these three sources of temperature-caused variations in operation, the change in viscosity is normally of the greatest importance, although it need not be corrected with extreme accuracy but only to an extent to continue a proper mode of operation. The change in magnetic strength is of less importance, but it must be corrected very accurately to maintain great accuracy in measurements. The change in fixed drift is of the least importance. Corrections must be made for viscosity and magnet changes, and preferably also for fixed drift changes, to achieve extreme accuracy. It has been found that all three of these changes are fairly linear with temperature for a wide range such as a 45° F. span, magnetic changes being very linear with temperature.

The prevention of temperature-caused errors is accomplished by utilizing a temperature sensor 40 which is shown mounted on the case 24 of the inertial apparatus. The apparatus is subjected to only slow changes in temperature, so temperature sensed by the temperature sensor 40 is substantially the same as the temperature of the floatation fluid 28, of the magnet 36, and of the fine wires (not shown) that connect the coils to the case and which produce the fixed drift. FIG. 5 illustrates the electronic circuit 50 which utilizes the position sensor or pickoff 29 and the temperature sensor 40, to generate rebalancing pulses that energize the torquer 33 to maintain the inertial sensor in its neutral position and to generate pulses on lines 52, 54 that lead to a computer that calculates the rotational position of the space vehicle.

The circuit 50 includes a convertor 56 which receives the position or pickoff signal $V_p$ on an input line 58, and which converts the AC input signal to a DC output signal on its output 60. If the inertial element moves away from its neutral position, the pickoff signal $V_p$ will be an alternating current of gradually increasing magnitude, and the signal on the output 60 of the convertor will be a DC signal of gradually increasing amplitude. The phase of the alternating signal $V_p$ and the polarity of the signal at 60 depends upon which direction the inertial element is moving. The output line 60 of the convertor enters two comparator circuits 62, 64. EAch comparator circuit has another input line 66, 68 where it receives a reference level signal, the signal at 68 being of the same magnitude but of opposite polarity to the signal at 66. EAch comparator circuit 62, 64 has an output line 70, 72 which carries only binary signals, the signal being "0" at all times except when the signal over line 60 exceeds the magnitude of the reference signal on the corresponding line 66 or 68. When the signal at 60 exceeds the reference signal input to a comparator circuit, the output 70 or 72 is a "1".

The outputs 70, 72 of the comparator circuits are delivered to a digital logic circuit 74 which also receives pulses on lines 76 from a clock 78 that may be used for other purposes in the spacecraft. The logic circuit 74 has two outputs 80 and 82 which can carry clock pulses. When the signal on the first comparator output 70 is a "1", then clock pulses appear on the logic circuit output 80, and when the second comparator circuit output 72 is a "1", then the second logic output 82 carries clock pulses. Only complete clock pulses appear on the lines 80 and 82, one clock pulse appearing on an output line when a "1" signal was present on a corresponding input line 70, 72 at the beginning of the clock pulse.

The logic circuit outputs 80, 82 are connected to a switch circuit assembly 84 which includes two electronic relay portions 86, 88, which can be formed by bipolar transistors. Each relay portion is enabled or turned on during the time it receives a pulse from a corresponding logic circuit output 80 or 82. The relay portions 86, 88 have inputs connected through large resistors 90, 92 to two outputs 94, 96 of a voltage regulator 98. Each of the outputs 94, 96 constantly supplies a closely regulated voltage $+V_r$ or $-V_r$, the voltages at 94 and 96 being of the same magnitude (with respect to ground) but of opposite polarity. When one of the relay portions such as 86 is turned on, current flows from a corresponding voltage regulator output 94 through the resistor 90 and relay portion to a torquer line 100 that leads to the input 102 of the torquer 33. The resistors 90, 92 are large so that a predetermined current magnitude flows through the line 100 when one of the regulator portions 86 or 88 is turned on.

The duration of each current pulse through line 100 is of an accurately controlled duration (equal to that of one clock pulse on line 76) and of accurately controlled magnitude. As a result, the total work performed by the pulse in restoring the inertial element to its neutral position can be held constant, so long as the efficiency of the torquer remains constant. The two computer lines 52, 54 transmit a pulse to the computer every time a torquer pulse is deliverd to the torquer. The computer merely has to add the pulses received over line 52 and subtract the number of pulses received over line 54 to determine the net increments of rotation, and merely has to multiply the net increments by the angle (such as 3 arc seconds) of each increment to determine the total angular rotation about the input axis of the system.

The change in gain of the inertial element due to temperature changes is compensated by varying the reference signals delivered over lines 66 and 68 to the comparators 62, 64. The temperature sensor 40 is a wire resistor with a high, linear, positive temperature coefficient. One terminal 110 of the sensor is connected to a voltage source $+V_a$ and another terminal 112 is connected through a pair of resistors 114, 116 to another voltage source $-V_a$. Two voltage sources $+V_a$ and $-V_a$ are provided so that the output at a line 118 is a low level signal having a large proportional variation with temperature.

The signal at 118 enters an operational amplifier 120 whose output $-E_t$ is a DC signal whose amplitude varies with the temperature of the inertial element environment including the floatation fluid. This signal is delivered over line 68 to one of the comparator circuits 64. The signal $-E_t$ also passes through another operational amplifier 124 whose output is $+E_t$. This signal passes into the reference input 66 of the other comparator circuit 62. Thus, the reference signals delivered at the lines 66, 68 to the comparator circuits are of magnitudes that vary with temperature. These reference signals are generated by temperature sensor means that includes a temperature sensor 40 and a pair of operational amplifiers 120, and 124.

When the temperature of the floatation fluid increases and causes an increase in the gain of the inertial element, the inertial element will rotate further for a given input rotation. Thus, for example, a 12 arc second rotation of the space vehicle that would have caused a 3 arc second rotation of the inertial element, might now cause a 3.5 arc second rotation of the inertial element. However, this is compensated because the increase in temperature causes the reference voltages to the comparators 62, 64 to increase, so that it now requires a 3.5 arc second rotation of the inertial element in order that the pickoff amplitude reaches a level to cause a torquer pulse. Also, the lower viscosity of the warmer floatation fluid permits the torquer pulse to rotate the inertial element by 3.5 arc seconds instead of 3 arc seconds, so that one torquer pulse still returns the inertial element to its neutral position. This manner of compensation results in each pulse to the computer over lines 52, 54 still representing a predetermined rotation such as 12 arc seconds of the space vehicle, so that the manner of computing space vehicle rotations does not have to be altered.

Figure 6:
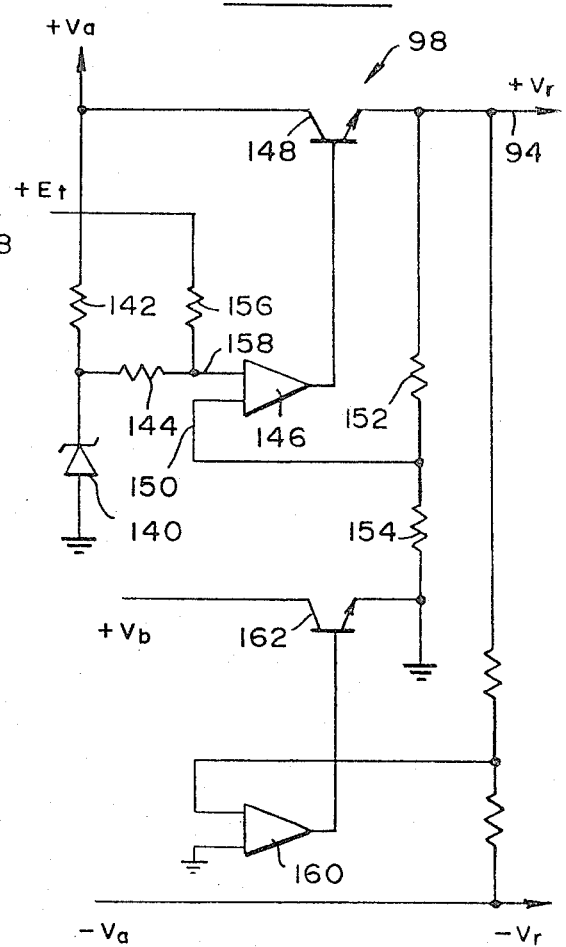
FIG. 6 is a partial, simplified circuit diagram of the voltage regulator of the circuit of FIG. 5.

The compensation for changes in strength of the magnets 36 of the torquer is accomplished by slightly varying the magnitudes of the voltages $+V_r$ and $-V_r$ generated by the voltage regulator 98. This is accomplished by connecting a portion of the output 130 of the operational amplifier 124 to a voltage regulator input 132 of the voltage regulator 98, which utilizes this temperature-dependent signal $E_t$ to vary the voltage regulator output. FIG. 6 is a simplified circuit diagram of the portion of the voltage regulator 98 that generates the voltage $+V_r$ on line 94. The circuit includes a Zener diode 140 connected through a resistor 142 to a voltage source $+V_a$. The Zener diode is connected through a resistor 144 to an operational amplifier 146 which drives a transistor 148. The operational amplifier therefore determines the voltage at the emitter of the transistor which is connected to the output line 94. Another input 150 of the operational amplifier is connected across a voltage divider formed by a pair of resistors 152, 154 that feed back a portion of the output voltage $+V_r$ so that a predetermined voltage $V_r$ is generated. The temperature-dependent signal $+E_t$ passes through a resistor 156 to the same input 158 of the operational amplifier which receives a signal from the Zener diode 140, to slightly alter the voltage at the amplifier input 158. The voltage $+V_r$ on the output 94 of the circuit remains almost constant at a predetermined level, such as 20 volts, but varies slightly, such as between 19.5 volts and 20.5 volts in accordance with variations in the temperature-dependent signal $+E_t$. The negative portion of the voltage regulator, which generates the signal $-V_r$, includes another operational amplifier 160 with one input connected to ground, another input connected to a voltage divider that connects the two output $+V_r$ and $-V_r$, and an output connected to the base of a transistor 162 that connects a low voltage (e.g., 6 volts) supply to the common terminal (which is shown grounded). The circuit is constructed so that the magnitude of the voltages $\pm V_r$ varies with temperature in an amount to offset the variation and strength of the permanent magnet of the torquer, so that one torquer pulse produces a constant work output from the torquer.

This manner of compensation for changes in magnetic strength essentially involves changing the current-time integral by changing the current magnitude. It would be possible to change the time interval instead of only the current magnitude, but this could interfere with proper operation of the computer and the circuitry could be more complicated.

The compensation for fixed drift is accomplished by the circuit of FIG. 5, by connecting the output 130 of the amplifier 124 through a large resistor 160 directly to the torquer 102. This results in a small current being constantly delivered to the torquer to urge the inertial element in a direction opposite to the direction in which the fine lead wires tend to turn the inertial element.

This compensation signal $I_c$ varies with temperature in an amount equal and opposite to the variation of the fixed drift with temperature, so that the fixed drift is always accurately compensated. The size of the resistor 160 varies from one gyroscope to the next, inasmuch as the amount of fixed drift is peculiar to each gyroscope. Also, the direction of drift may be different for different gyroscopes, and therefore the resistor 160 may be connected to the output of the first operational amplifier 120 which generates the signal $-E_t$ instead of to the second amplifier 124.

Figure 7:
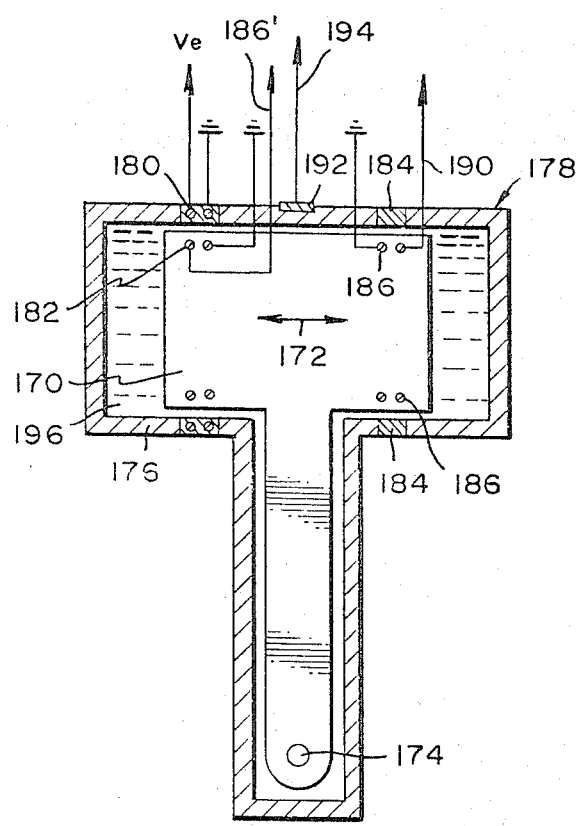
FIG. 7 is a simplified sectional view of the mechanical portion of an accelerometer sensor system constructed in accordance with the invention.

The same circuit shown in FIG. 5 can be utilized in an accelerometer type inertial sensor, such as the simplified accelerometer illustrated in FIG. 7. In the accelerometer of FIG. 7, a weight or pendulum 170 is utilized which moves in the direction of arrows 172 about a pivot 174 when the case 176 moves. Movement of the pendulum is sensed by a position sensor or pickoff 178 which includes a first pair of coils 180 fixed to the case 176 and energized from a voltage source $V_e$, and by another pair of coils 182 fixed to the pendulum for generating an output over line 186'. The pendulum is restored to its initial position by a linear motor which includes a pair of permanent magnets 184 fixed to the case, and a pair of coils 186 which receive a drive signal input over line 190. A temperature sensor 192 has an output 194 that senses the temperature of the environment of the pendulum 170, and particularly of the floatation fluid 196 surrounding the pendulum. The accelerometer can be connected to a circuit of the same type as shown in FIG. 5, by connecting the pickoff output 186' to the input of the convertor 56, connecting the temperature sensor output 194 to the resistor 114 in the circuit of FIG. 5, and by connecting the motor line 190 to the line 100 of that circuit. The circuit of FIG. 5 will then deliver a pulse that returns the pendulum 170 to its neutral position when it moves a predetermined distance therefrom. The circuit of FIG. 5 will then correct for changes in gain (movement of the pendulum for a given acceleration-time integral of the case) due to temperature-caused variations in viscosity of the floatation fluid 196, in the strength of the motor magnets 184, and in the fixed bias that tends to urge the pendulum to pivot in one direction.

Thus, the invention provides a circuit for use in a digital rebalance inertial sensor system, which compensates for temperature-caused change in the gain of the inertial element, change in the efficiency of the rebalancing motor, and change in fixed drift or bias. The circuit uses a minimum of power, inasmuch as it compensates for changes due to temperature rather than heating the entire environment of the inertial element. The circuit compensates for a plurality of temperature-dependent changes by using only a single temperature sensor. Furthermore, a standard temperature sensor can be installed in a wide variety of gyroscope system constructions, because the changes resulting from the temperature sensor signal are determined by electronic circuits that are normally not mounted on the inertial element case. The circuit compensates for changes in inertial element gain so that each pulse delivered to the computer represents the same movement of the space vehicle. The circuit also compensates for changes in the efficiency of the rebalancing motor (torquer or linear motor) so that the same number of pulses, which may be just one pulse, return the inertial element to its neutral position. The circuit also provides a temperature-dependent compensation for the fixed bias of the inertial element. This is all accomplished in a standard type of circuit construction which utilizes a single standardized temperature sensor at the mechanical portion of the sensor system.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. An inertial sensor system comprising:
   a moveable inertial element;
   position sensor means mounted adjacent to said inertial element, for generating an electrical signal value dependent upon the position of the inertial element;
   motor means mounted adjacent to said inertial element and energizable to move said element in a direction to counteract movement of the inertial element relative to the position sensor means;
   temperature sensor means positioned in the environment of said inertial element, for generating a signal value dependent upon the temperature thereat;
   comparator means having first and second inputs and having an output having first and second digital states dependent upon the difference between the signal values at the inputs;
   means responsive to the state of the comparator output for energizing the motor means at times when the comparator output has said second digital state;
   means coupling the output of said position sensor means to said first comparator means input; and
   means coupling the output of said temperature sensor means to said second comparator means input.

2. The system described in claim 1 wherein:
said means for energizing the motor means includes a clock that generates pulses at a predetermined constant rate and with each pulse having a predetermined duration, a logic circuit having inputs coupled to said clock and said comparator means for generating an output pulse of a duration equal to a clock pulse when the comparator output is in the second state, a closely regulated power supply, and a controlled switch coupled to said logic circuit for coupling said power supply to said motor means for the duration of a pulse from said logic circuit; and
means responsive to the signal value of said temperature sensor means for varying the output level of said power supply, whereby to also compensate for variations in efficiency of said motor means with temperature.

3. The system described in claim 1 including:
means for constantly coupling the output of said temperature sensor means to said motor means independently of said means for energizing the motor means, whereby to provide a temperature-compensated correction for fixed bias of the inertial element.

4. An inertial sensor system for sensing movement of an object comprising:
a case having means for mounting it on the object;
a moveable inertial element moveably mounted in the case;
a viscous floatation fluid disposed in said case around said inertial element;
position sensor means for sensing the position of said inertial element relative to said case, said sensor means generating a direct current signal of a polarity and a magnitude dependent respectively upon the direction and magnitude of the deviation of said inertial element from a predetermined position relative to said case;
an electromagnetic motor having first and second adjacent portions respectively mounted on said inertial element and said case, at least one of said portions being a permanent magnet and the other being an electromagnet for driving the inertial element in accordance with current supplied thereto;
temperature sensor means for measuring substantially the temperature of said floatation fluid, said temperature sensor means generating first and second output signals of opposite polarities and of magnitudes dependent upon the temperature of substantially said floatation fluid;
first and second comparator circuits, each having one input coupled to said position sensor means and each having another input coupled to said temperature sensor means to receive one of said output signals therefrom, each comparator circuit having a binary output dependent upon whether the signal magnitude from the position sensor exceeds a corresponding output signal from the temperature sensor means;
clock means for generating clock pulses of constant duration and repetition rate;
logic means having first and second outputs, first and second inputs respectively coupled to said first and second comparator means, and a third input coupled to said clock means, said logic means delivering clock pulses on either of its output lines depending on which comparator circuit delivers a predetermined binary signal indicating that the signal from the position sensor has exceeded a threshold level at a predetermined polarity;
a voltage source having a control input coupled to said temperature sensor means, for generating first and second electrical outputs of opposite polarity and of magnitudes dependent upon the output of the temperature sensor means;
switch means having a pair of energizing units respectively coupled to the first and second outputs of said voltage source, an output coupled to said electromagnetic motor, and a pair of control inputs respectively coupled to said first and second outputs of said logic means, for delivering pulses of either polarity from said voltage source to said driver means, at times and durations determined by the durations of pulses from said logic means, whereby to compensate for temperature change in the ratio between movement of the object and inertial element and to compensate for changes in efficiency of the driver means with temperature.

5. A gyro system for connection to a computer that determines angle change by counting the number of pulses generated, comprising:
a rotor assembly;
a case assembly disposed about said rotor assembly;
floatation fluid disposed in said case assembly about said rotor assembly, said fluid having a viscosity that varies with temperature;
pickup means for generating a signal of a magnitude proportional to displacement of said rotor assembly relative to said case assembly;
a torquer for rotating said rotor assembly relative to said case assembly, the work output of said torquer for a predetermined current delivered thereto over a predetermined time varying with temperature;
pulse generating means connected to said pickup means for generating a drive pulse of closely controlled duration and amplitude in response to movement of said rotor assembly from a predetermined neutral position relative to said case assembly;
means for coupling said generating means to said torquer, for energizing said torquer to return the rotor assembly to said neutral position;
temperature sensor means for generating a temperature responsive signal dependent on the temperature substantially of said floatation fluid;
means coupling the output of said temperature sensor means to said generating means, for varying the magnitude of rotor movement required to generate a drive pulse, in an amount that offsets changes in floatation fluid viscosity so that one drive pulse is generated in response to a predetermined angular rotation of the rotor assembly about its input axis; and
means coupling the output of said temperature sensor means to said generating means, for altering the integral of current magnitude over the duration of a drive pulse, in an amount that offsets changes in efficiency of said torquer.

6. The gyro system described in claim 5 including:
means connecting said temperature sensor means to said torquer for constantly delivering a signal propor-tionate to said temperature responsive signal, to said torquer, whereby to compensate for fixed drift.

7. An accelerometer system for connection to a computer that determines speed or position change by counting the number of pulses generated, comprising:
  a moveable mass assembly;
  a case assembly disposed about said mass assembly;
  floatation fluid disposed in said case assembly about said mass assembly, said fluid having a viscosity that varies with temperature;
  means for generating a signal of a magnitude proportional to displacement of said mass assembly relative to said case assembly;
  a linear motor for moving said mass assembly relative to said case assembly, the work output of said motor for a predetermined current-time integral varying with temperature;
  means connected to said signal generating means for generating a drive pulse of closely controlled duration and amplitude in response to the movement of said mass assembly from a predetermined neutral position relative to said case assembly exceeding a threshold level;
  means for coupling said generating means to said motor, for energizing said motor to return the mass assembly to said neutral position;
  temperature sensor means for generating a temperature responsive signal dependent on the temperature substantially of said floatation fluid;
  means coupling the output of said temperature sensor means to said generating means, for regulating the threshold level at which said generating means generates a drive pulse, in an amount that offsets the change in floatation fluid viscosity, so that one drive pulse is generated in response to a predetermined acceleration-time integral of the case assembly; and
  means coupling the output of said temperature sensor means to said generating means, for altering the integral of drive pulse magnitude over the duration of a drive pulse, in an amount that offsets changes in the efficiency of said motor.

8. The accelerometer system described in claim 7 including:
  means connecting said temperature sensor means to said motor for constantly delivering a signal proportionate to said temperature responsive signal, to said motor, whereby to compensate for fixed bias.

* * * * *